US011498283B2

(12) United States Patent
Dubelman et al.

(10) Patent No.: US 11,498,283 B2
(45) Date of Patent: Nov. 15, 2022

(54) METHOD AND APPARATUS FOR BUILD THICKNESS CONTROL IN ADDITIVE MANUFACTURING

(71) Applicant: General Electric Company, Schenectady, NY (US)

(72) Inventors: Meredith Elissa Dubelman, Liberty Township, OH (US); Mary Kathryn Thompson, Hamilton, OH (US); Christopher Barnhill, Cincinnati, OH (US); Xi Yang, Mason, OH (US)

(73) Assignee: General Electric Company, Schenectady, NY (US)

( * ) Notice: Subject to any disclaimer, the term of this patent is extended or adjusted under 35 U.S.C. 154(b) by 140 days.

(21) Appl. No.: 16/280,390

(22) Filed: Feb. 20, 2019

(65) Prior Publication Data

US 2020/0262151 A1 Aug. 20, 2020

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/106* (2017.08); *B33Y 10/00* (2014.12); *B33Y 30/00* (2014.12); *B33Y 50/02* (2014.12)

(58) Field of Classification Search
CPC .......... B33Y 10/00; B33Y 30/00; B33Y 50/02
(Continued)

(56) References Cited

U.S. PATENT DOCUMENTS 4,575,330 A 3/1986 Hull
4,752,498 A 6/1988 Fudim
(Continued)

FOREIGN PATENT DOCUMENTS

CN 107053663 A 8/2017
CN 107322930 11/2017
(Continued)

OTHER PUBLICATIONS

Clijsters et al., In situ quality control of the selective laser melding process using a high-speed, real-time melt pool monitoring system, Int.J. Adv. Manuf. Technol., 2014.*
(Continued)

*Primary Examiner* — Md Azad
(74) *Attorney, Agent, or Firm* — Dinsmore & Shohl LLP

(57) ABSTRACT

A method for forming a part layer by layer using an additive manufacturing apparatus. The additive manufacturing apparatus includes a resin support, a stage, a measuring system, and an actuator configured to change the relative position of the stage and the resin support. The method includes the steps of: performing an additive manufacturing cycle including the following steps: depositing an uncured layer of resin; moving the stage to a target location; curing the uncured layer of resin; and moving the stage away from the target location; repeating the additive manufacturing cycle; performing a measuring process wherein the measuring process includes the following steps: using the measuring system to take a measurement indicative of an actual position of a structure; comparing the actual position of the structure to an expected position of the structure to determine an error; and using the error to modify the target location.

25 Claims, 10 Drawing Sheets

(51) Int. Cl.
  *B33Y 30/00* (2015.01)
  *B33Y 50/02* (2015.01)
  *B29C 64/106* (2017.01)

(58) Field of Classification Search
  USPC ........................................................ 700/117
  See application file for complete search history.

(56) References Cited

U.S. PATENT DOCUMENTS

| | | |
|---|---|---|
| 5,026,146 A | 6/1991 | Hug et al. |
| 5,031,120 A | 7/1991 | Pomerantz et al. |
| 5,058,988 A | 10/1991 | Spence et al. |
| 5,059,021 A | 10/1991 | Spence et al. |
| 5,096,530 A | 3/1992 | Cohen |
| 5,104,592 A | 4/1992 | Hull et al. |
| 5,123,734 A | 6/1992 | Spence et al. |
| 5,126,259 A | 6/1992 | Weiss et al. |
| 5,126,529 A | 6/1992 | Weiss et al. |
| 5,133,987 A | 7/1992 | Spence et al. |
| 5,174,931 A | 12/1992 | Almquist et al. |
| 5,182,055 A | 1/1993 | Allison et al. |
| 5,192,559 A | 3/1993 | Hull et al. |
| 5,203,944 A | 4/1993 | Prinz et al. |
| 5,204,055 A | 4/1993 | Sachs et al. |
| 5,207,371 A | 5/1993 | Prinz et al. |
| 5,236,637 A | 8/1993 | Hull |
| 5,258,146 A | 11/1993 | Almquist et al. |
| 5,314,711 A | 5/1994 | Baccini |
| 5,340,656 A | 8/1994 | Sachs et al. |
| 5,387,380 A | 2/1995 | Cima et al. |
| 5,432,045 A | 7/1995 | Narukawa et al. |
| 5,447,822 A | 9/1995 | Hull et al. |
| 5,454,069 A | 9/1995 | Knapp et al. |
| 5,496,682 A | 3/1996 | Quadir et al. |
| 5,626,919 A | 5/1997 | Chapman et al. |
| 5,650,260 A | 7/1997 | Onishi |
| 5,660,621 A | 8/1997 | Bredt |
| 5,665,401 A | 9/1997 | Serbin et al. |
| 5,697,043 A | 12/1997 | Baskaran et al. |
| 5,718,279 A | 2/1998 | Saoth et al. |
| 5,807,437 A | 9/1998 | Sachs et al. |
| 5,824,184 A | 10/1998 | Kamijo et al. |
| 5,851,465 A | 12/1998 | Bredt |
| 5,891,382 A | 4/1999 | Almquist et al. |
| 5,940,674 A | 8/1999 | Sachs et al. |
| 5,985,204 A | 11/1999 | Otsuka et al. |
| 6,051,179 A | 4/2000 | Hagenau |
| 6,146,567 A | 11/2000 | Sachs et al. |
| 6,193,923 B1 | 2/2001 | Leyden et al. |
| 6,200,646 B1 | 3/2001 | Neckers et al. |
| 6,206,672 B1 | 3/2001 | Grenda |
| 6,363,606 B1 | 4/2002 | Johnson et al. |
| 6,376,148 B1 | 4/2002 | Liu et al. |
| 6,401,002 B1 | 6/2002 | Jang et al. |
| 6,403,002 B1 | 6/2002 | van der Geest |
| 6,436,520 B1 | 8/2002 | Yamamoto |
| 6,471,800 B2 | 10/2002 | Jang et al. |
| 6,500,378 B1 | 12/2002 | Smith |
| 6,575,218 B1 | 6/2003 | Burns et al. |
| 6,596,224 B1 | 7/2003 | Sachs et al. |
| 6,780,368 B2 | 8/2004 | Liu et al. |
| 6,838,035 B1 | 1/2005 | Ederer et al. |
| 6,850,334 B1 | 2/2005 | Gothait |
| 6,852,272 B2 | 2/2005 | Artz et al. |
| 6,896,839 B2 | 5/2005 | Kubo et al. |
| 6,930,144 B2 | 8/2005 | Oriakhi |
| 6,966,960 B2 | 11/2005 | Boyd et al. |
| 6,974,521 B2 | 12/2005 | Schermer |
| 6,986,654 B2 | 1/2006 | Imiolek et al. |
| 7,008,209 B2 | 3/2006 | Iskra et al. |
| 7,022,207 B2 | 4/2006 | Hirsch |
| 7,052,263 B2 | 5/2006 | John |
| 7,087,109 B2 | 8/2006 | Bredr et al. |
| 7,195,472 B2 | 3/2007 | John |
| 7,270,528 B2 | 9/2007 | Sherwood |
| 7,300,613 B2 | 11/2007 | Sano et al. |
| 7,351,304 B2 | 4/2008 | Liang et al. |
| 7,438,846 B2 | 10/2008 | John |
| 7,455,804 B2 | 11/2008 | Patel |
| 7,520,740 B2 | 4/2009 | Wahlstrom et al. |
| 7,550,518 B2 | 6/2009 | Bredt et al. |
| 7,572,403 B2 | 8/2009 | Gu et al. |
| 7,578,958 B2 | 8/2009 | Patel et al. |
| 7,614,866 B2 | 11/2009 | Sperry et al. |
| 7,636,610 B2 | 12/2009 | Schillen et al. |
| 7,698,947 B2 | 4/2010 | Sarr |
| 7,706,910 B2 | 4/2010 | Hull et al. |
| 7,767,132 B2 | 8/2010 | Patel et al. |
| 7,783,371 B2 | 8/2010 | John et al. |
| 7,785,093 B2 | 8/2010 | Holmboe et al. |
| 7,790,093 B2 | 9/2010 | Shkolnik et al. |
| 7,795,349 B2 | 9/2010 | Bredt et al. |
| 7,815,826 B2 | 10/2010 | Serdy et al. |
| 7,845,930 B2 | 12/2010 | Shkolnik et al. |
| 7,867,302 B2 | 1/2011 | Nevoret et al. |
| 7,892,474 B2 | 2/2011 | Shkolnik et al. |
| 7,894,921 B2 | 2/2011 | John et al. |
| 8,003,040 B2 | 8/2011 | El-Siblani |
| 8,017,055 B2 | 9/2011 | Davidson et al. |
| 8,029,642 B2 | 10/2011 | Hagman |
| 8,048,261 B2 | 11/2011 | McCowin |
| 8,105,066 B2 | 1/2012 | Sperry et al. |
| 8,110,135 B2 | 2/2012 | El-Siblani |
| 8,126,580 B2 | 2/2012 | El-Siblani et al. |
| 8,157,908 B2 | 4/2012 | Williams |
| 8,185,229 B2 | 5/2012 | Davidson |
| 8,096,262 B2 | 6/2012 | Ederer et al. |
| 8,191,500 B2 | 6/2012 | Dohring et al. |
| 8,211,226 B2 | 7/2012 | Bredt et al. |
| 8,282,866 B2 | 10/2012 | Hiraide |
| 8,326,024 B2 | 12/2012 | Sckolnik et al. |
| 8,372,330 B2 | 2/2013 | El-Siblani et al. |
| 8,394,313 B2 | 3/2013 | El-Siblani et al. |
| 8,424,580 B2 | 4/2013 | Anderson et al. |
| 8,444,903 B2 | 5/2013 | Lyons et al. |
| 8,475,946 B1 | 7/2013 | Dion et al. |
| 8,506,862 B2 | 8/2013 | Giller et al. |
| 8,506,870 B2 | 8/2013 | Hochsmann et al. |
| 8,568,646 B2 | 10/2013 | Wang et al. |
| 8,568,649 B1 | 10/2013 | Balistreri et al. |
| 8,616,872 B2 | 12/2013 | Matsui et al. |
| 8,623,264 B2 | 1/2014 | Rohner et al. |
| 8,636,494 B2 | 1/2014 | Gothait et al. |
| 8,636,496 B2 | 1/2014 | Das et al. |
| 8,658,076 B2 | 2/2014 | El-Siblani |
| 8,666,142 B2 | 3/2014 | Shkolnik et al. |
| 8,715,832 B2 | 5/2014 | Ederer et al. |
| 8,741,194 B1 | 6/2014 | Ederer et al. |
| 8,741,203 B2 | 6/2014 | Liska et al. |
| 8,761,918 B2 | 6/2014 | Silverbrook |
| 8,801,418 B2 | 8/2014 | El-Siblani et al. |
| 8,815,143 B2 | 8/2014 | John et al. |
| 8,844,133 B2 | 9/2014 | Fuller |
| 8,845,316 B2 | 9/2014 | Schillen et al. |
| 8,845,953 B1 | 9/2014 | Balistreri et al. |
| 8,873,024 B2 | 10/2014 | Jamar et al. |
| 8,876,513 B2 | 11/2014 | Lim et al. |
| 8,888,480 B2 | 11/2014 | Yoo et al. |
| 8,915,728 B2 | 12/2014 | Mironets et al. |
| 8,926,304 B1 | 1/2015 | Chen |
| 8,932,511 B2 | 1/2015 | Napadensky |
| 8,968,625 B2 | 3/2015 | Tan |
| 8,991,211 B1 | 3/2015 | Arlotti et al. |
| 8,998,601 B2 | 4/2015 | Busato |
| 9,031,680 B2 | 5/2015 | Napadensky |
| 9,064,922 B2 | 6/2015 | Nakajima et al. |
| 9,067,359 B2 | 6/2015 | Rohner et al. |
| 9,067,361 B2 | 6/2015 | El-Siblani |
| 9,073,260 B2 | 7/2015 | El-Siblani et al. |
| 9,101,321 B1 | 8/2015 | Kiesser |
| 9,150,032 B2 | 10/2015 | Roof et al. |
| 9,205,601 B2 | 12/2015 | DeSimone et al. |
| 9,211,678 B2 | 12/2015 | DeSimone et al. |
| 9,216,546 B2 | 12/2015 | DeSimone et al. |

(56) References Cited

U.S. PATENT DOCUMENTS

| | | | |
|---|---|---|---|
| 9,233,504 B2 | 1/2016 | Douglas et al. |
| 9,248,600 B2 | 2/2016 | Goodman et al. |
| 9,259,880 B2 | 2/2016 | Chen |
| 9,308,690 B2 | 4/2016 | Boyer et al. |
| 9,327,385 B2 | 5/2016 | Webb et al. |
| 9,360,757 B2 | 6/2016 | DeSimone et al. |
| 9,364,848 B2 | 6/2016 | Silverbrook |
| 9,403,322 B2 | 8/2016 | Das et al. |
| 9,403,324 B2 | 8/2016 | Ederer et al. |
| 9,415,544 B2 | 8/2016 | Kerekes et al. |
| 9,415,547 B2 | 8/2016 | Chen et al. |
| 9,429,104 B2 | 8/2016 | Fuller |
| 9,434,107 B2 | 9/2016 | Zenere |
| 9,446,557 B2 | 9/2016 | Zenere et al. |
| 9,453,142 B2 | 9/2016 | Rolland et al. |
| 9,456,884 B2 | 10/2016 | Uckelmann et al. |
| 9,457,374 B2 | 10/2016 | Hibbs et al. |
| 9,463,488 B2 | 10/2016 | Ederer et al. |
| 9,469,074 B2 | 10/2016 | Ederer et al. |
| 9,486,944 B2 | 11/2016 | El-Siblani et al. |
| 9,487,443 B2 | 11/2016 | Watanabe |
| 9,498,920 B2 | 11/2016 | DeSimone et al. |
| 9,511,546 B2 | 12/2016 | Chen et al. |
| 9,517,591 B2 | 12/2016 | Yoo et al. |
| 9,517,592 B2 | 12/2016 | Yoo et al. |
| 9,527,244 B2 | 12/2016 | El-Siblani |
| 9,529,371 B2 | 12/2016 | Nakamura |
| 9,533,450 B2 | 1/2017 | El-Siblani et al. |
| 9,539,762 B2 | 1/2017 | Durand et al. |
| 9,545,753 B2 | 1/2017 | Costabeber |
| 9,545,784 B2 | 1/2017 | Nakamura |
| 9,561,622 B2 | 2/2017 | Das et al. |
| 9,561,623 B2 | 2/2017 | El-Siblani et al. |
| 9,578,695 B2 | 2/2017 | Jerby et al. |
| 9,579,852 B2 | 2/2017 | Okamoto |
| 9,581,530 B2 | 2/2017 | Guthrie et al. |
| 9,592,635 B2 | 3/2017 | Ebert et al. |
| 9,604,411 B2 | 3/2017 | Rogren |
| 9,632,037 B2 | 4/2017 | Chen et al. |
| 9,632,420 B2 | 4/2017 | Allanic |
| 9,632,983 B2 | 4/2017 | Ueda et al. |
| 9,636,873 B2 | 5/2017 | Joyce |
| 9,649,812 B2 | 5/2017 | Hartmann et al. |
| 9,649,815 B2 | 5/2017 | Atwood et al. |
| 9,670,371 B2 | 6/2017 | Pervan et al. |
| 9,676,143 B2 | 6/2017 | Kashani-Shirazi |
| 9,676,963 B2 | 6/2017 | Rolland et al. |
| 9,682,166 B2 | 6/2017 | Watanabe |
| 9,682,425 B2 | 6/2017 | Xu et al. |
| 9,821,546 B2 | 11/2017 | Schaafsma et al. |
| 9,862,146 B2 | 1/2018 | Driessen et al. |
| 9,895,843 B2 | 2/2018 | Lobovsky et al. |
| 9,901,983 B2 | 2/2018 | Hovel et al. |
| 9,908,293 B2 | 3/2018 | Yoo et al. |
| 9,919,474 B2 | 3/2018 | Napadensky |
| 10,000,023 B2 | 6/2018 | El-Siblani et al. |
| 10,011,076 B2 | 7/2018 | El-Siblani et al. |
| 2002/0165635 A1* | 11/2002 | Farren ............ G05B 19/4099 |
| | | 700/120 |
| 2003/0180171 A1 | 9/2003 | Artz et al. |
| 2008/0170112 A1 | 7/2008 | Hull et al. |
| 2010/0003619 A1 | 1/2010 | Das et al. |
| 2010/0125356 A1* | 5/2010 | Shkolnik ............ G06T 5/006 |
| | | 700/98 |
| 2011/0089610 A1 | 4/2011 | El-Siblani et al. |
| 2012/0195994 A1 | 8/2012 | El-Siblani et al. |
| 2013/0140741 A1 | 6/2013 | El-Siblani et al. |
| 2014/0036455 A1* | 2/2014 | Napadensky ........ B33Y 50/02 |
| | | 361/748 |
| 2014/0103581 A1 | 4/2014 | Das et al. |
| 2014/0239554 A1 | 8/2014 | El-Siblani |
| 2014/0275317 A1 | 9/2014 | Moussa |
| 2014/0319735 A1 | 10/2014 | El-Siblani et al. |
| 2014/0322374 A1 | 10/2014 | El-Siblani et al. |
| 2015/0004042 A1 | 1/2015 | Nimal |
| 2015/0056365 A1 | 2/2015 | Miyoshi |
| 2015/0102531 A1 | 4/2015 | El-Siblani et al. |
| 2015/0104563 A1 | 4/2015 | Lowe et al. |
| 2015/0140152 A1 | 5/2015 | Chen |
| 2015/0145174 A1 | 5/2015 | Comb |
| 2015/0165695 A1 | 6/2015 | Chen et al. |
| 2015/0224710 A1 | 8/2015 | El-Siblani |
| 2015/0231828 A1 | 8/2015 | El-Siblani et al. |
| 2015/0231831 A1 | 8/2015 | El-Siblani |
| 2015/0246487 A1 | 9/2015 | El-Siblani |
| 2015/0301517 A1 | 10/2015 | Chen et al. |
| 2015/0306825 A1 | 10/2015 | Chen et al. |
| 2015/0321421 A1 | 11/2015 | Ding |
| 2015/0355553 A1 | 12/2015 | Allanic |
| 2016/0016361 A1 | 1/2016 | Lobovsky et al. |
| 2016/0031010 A1 | 2/2016 | O'Neill et al. |
| 2016/0046075 A1 | 2/2016 | DeSimone et al. |
| 2016/0046080 A1 | 2/2016 | Thomas et al. |
| 2016/0052205 A1 | 2/2016 | FrantzDale |
| 2016/0059484 A1 | 3/2016 | DeSimone et al. |
| 2016/0059485 A1 | 3/2016 | Ding et al. |
| 2016/0082671 A1 | 3/2016 | Joyce |
| 2016/0096332 A1 | 4/2016 | Chen et al. |
| 2016/0107340 A1 | 4/2016 | Joyce |
| 2016/0107387 A1 | 4/2016 | Ooba et al. |
| 2016/0129631 A1 | 5/2016 | Chen et al. |
| 2016/0193785 A1 | 7/2016 | Bell et al. |
| 2016/0214327 A1 | 7/2016 | Ucklemann et al. |
| 2016/0221262 A1 | 8/2016 | Das et al. |
| 2016/0288413 A1* | 10/2016 | Yakubov ............ B29C 64/255 |
| 2016/0303798 A1 | 10/2016 | Mironets et al. |
| 2016/0332386 A1 | 11/2016 | Kuijpers |
| 2016/0361872 A1 | 12/2016 | El-Siblani |
| 2017/0008234 A1 | 1/2017 | Cullen et al. |
| 2017/0008236 A1 | 1/2017 | Easter et al. |
| 2017/0021562 A1 | 1/2017 | El-Siblani et al. |
| 2017/0066185 A1 | 3/2017 | Ermoshkin et al. |
| 2017/0066196 A1 | 3/2017 | Beard et al. |
| 2017/0072635 A1 | 3/2017 | El-Siblani et al. |
| 2017/0080641 A1 | 3/2017 | El-Siblani |
| 2017/0087670 A1 | 3/2017 | Kalentics et al. |
| 2017/0100895 A1 | 4/2017 | Chou et al. |
| 2017/0100897 A1 | 4/2017 | Chou et al. |
| 2017/0100899 A1 | 4/2017 | El-Siblani et al. |
| 2017/0102679 A1 | 4/2017 | Greene et al. |
| 2017/0113409 A1 | 4/2017 | Patrov |
| 2017/0120332 A1 | 5/2017 | DeMuth et al. |
| 2017/0120333 A1 | 5/2017 | DeMuth et al. |
| 2017/0120334 A1 | 5/2017 | DeMuth et al. |
| 2017/0120335 A1 | 5/2017 | DeMuth et al. |
| 2017/0120336 A1 | 5/2017 | DeMuth et al. |
| 2017/0120387 A1 | 5/2017 | DeMuth et al. |
| 2017/0120518 A1 | 5/2017 | DeMuth et al. |
| 2017/0120529 A1 | 5/2017 | DeMuth et al. |
| 2017/0120530 A1 | 5/2017 | DeMuth et al. |
| 2017/0120537 A1 | 5/2017 | DeMuth et al. |
| 2017/0120538 A1 | 5/2017 | DeMuth et al. |
| 2017/0123222 A1 | 5/2017 | DeMuth et al. |
| 2017/0123237 A1 | 5/2017 | DeMuth et al. |
| 2017/0136688 A1 | 5/2017 | Knecht et al. |
| 2017/0136708 A1 | 5/2017 | Das et al. |
| 2017/0165916 A1 | 6/2017 | El-Siblani |
| 2017/0173865 A1 | 6/2017 | Dikovsky et al. |
| 2017/0182708 A1 | 6/2017 | Lin et al. |
| 2017/0190120 A1 | 7/2017 | Bloome et al. |
| 2017/0276651 A1 | 9/2017 | Hall |
| 2017/0284971 A1 | 10/2017 | Hall |
| 2017/0291804 A1 | 10/2017 | Craft et al. |
| 2017/0297108 A1 | 10/2017 | Gibson et al. |
| 2017/0297109 A1 | 10/2017 | Gibson et al. |
| 2018/0001567 A1 | 1/2018 | Juan et al. |
| 2018/0126629 A1 | 5/2018 | Staal et al. |
| 2018/0134029 A1 | 5/2018 | Myerberg et al. |
| 2018/0154484 A1* | 6/2018 | Hall ................ B23K 26/12 |
| 2018/0169953 A1 | 6/2018 | Matusik et al. |
| 2018/0200948 A1* | 7/2018 | Kuijpers ............ B29C 64/124 |
| 2018/0215103 A1* | 8/2018 | Herzog ............. B29C 64/393 |

(56) References Cited

U.S. PATENT DOCUMENTS

| | | | |
|---|---|---|---|
| 2018/0229436 A1 | | 8/2018 | Gu et al. |
| 2019/0126536 A1* | | 5/2019 | Thompson ............ B29C 64/264 |

FOREIGN PATENT DOCUMENTS

| | | | |
|---|---|---|---|
| CN | 108031844 | A | 5/2018 |
| JP | 2002370286 | | 12/2002 |
| JP | 2003039564 | | 2/2003 |
| JP | 2004257929 | | 9/2004 |
| WO | 1992011577 | A1 | 7/1992 |
| WO | 9806560 | | 2/1998 |
| WO | 2006077665 | | 7/2006 |
| WO | 2017009368 | | 1/2017 |
| WO | 2018170545 | A1 | 9/2018 |
| WO | 2018176145 | A1 | 10/2018 |

OTHER PUBLICATIONS

Hafkamp et al., Mechatronics, 2018, https://doi.org/10.1016/j.mechatronics.2018.02.006, The Netherlands.

Nussbaum et al., Evaluation of Processing Variables in Large Area Polymer Sintering of Single Layer Components, Solid Freeform Fabrication 2016: Proceedings of the 27th Annual International Solid Freeform Fabracation Symposium—An Additive Manufacturing Conference Reviewed Paper, University of South Florida, Tampa, Florida, US.

Matthews et al., Diode-Based Additive Manufacturing of Metals Using an Optically-Addressable Light Valve, Optic Express Research Article, May 10, 2017, vol. 25, No. 10, Lawrence Livermore National Laboratory, Livermore, California, US.

Lee et al., Large-Area Compatible Laser Sintering Schemes with a Spatially Extended Focused Beam, www.mdpi.com/journal/micromachines. Article May 11, 2017, Micromachines, Seoul University, Seoul, Korea.

International Search Report and Written Opinion for application PCT/US2020/018956 dated May 27, 2020 (12 pages).

European Office Action for Application No. 20712125.6 dated Aug. 30, 2022 (8 pages).

Supplemental Search Report for Chinese Application No. 202080016011.2 dated Sep. 5, 2022 (3 pages).

* cited by examiner

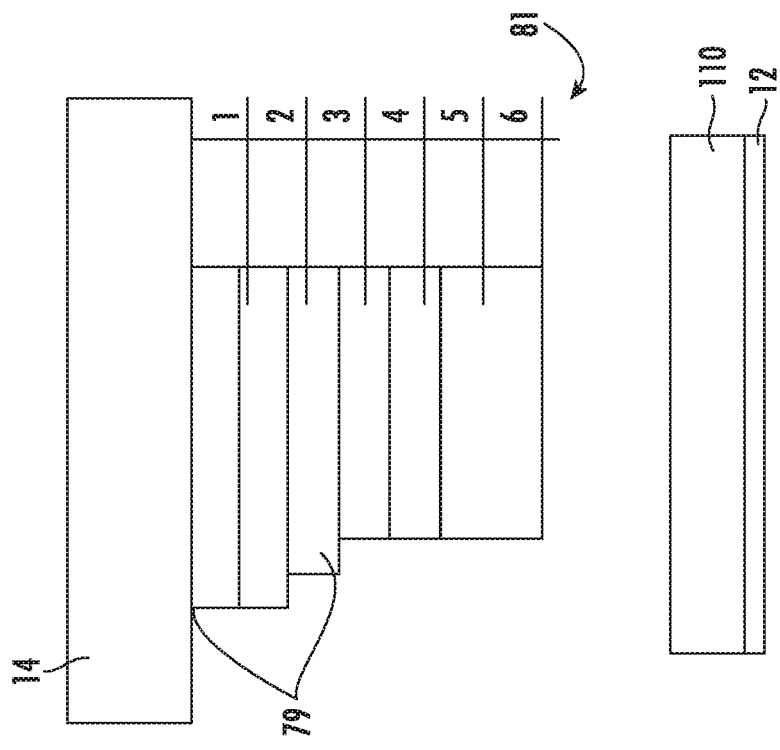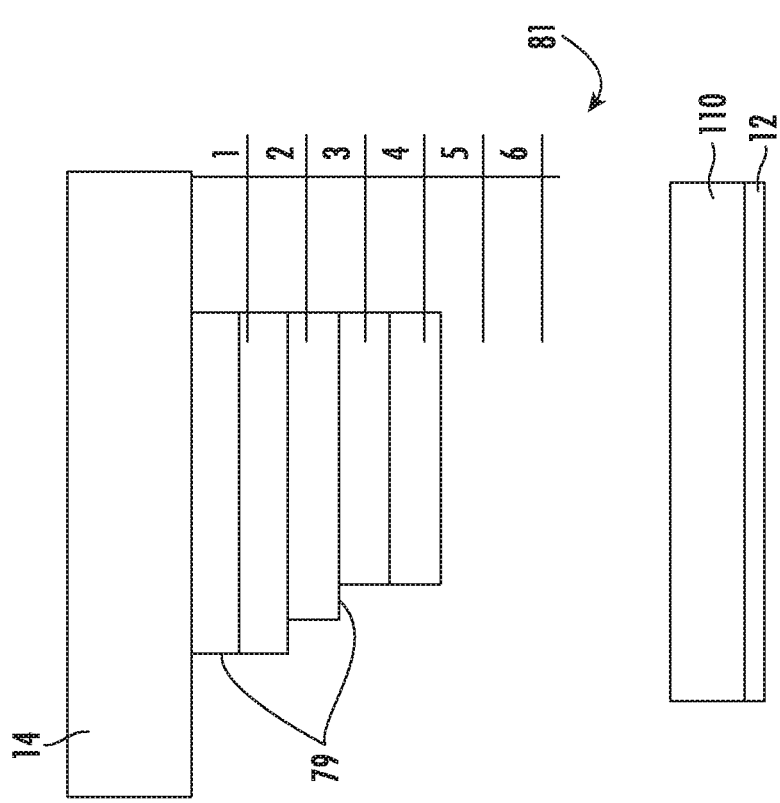
FIG. 9

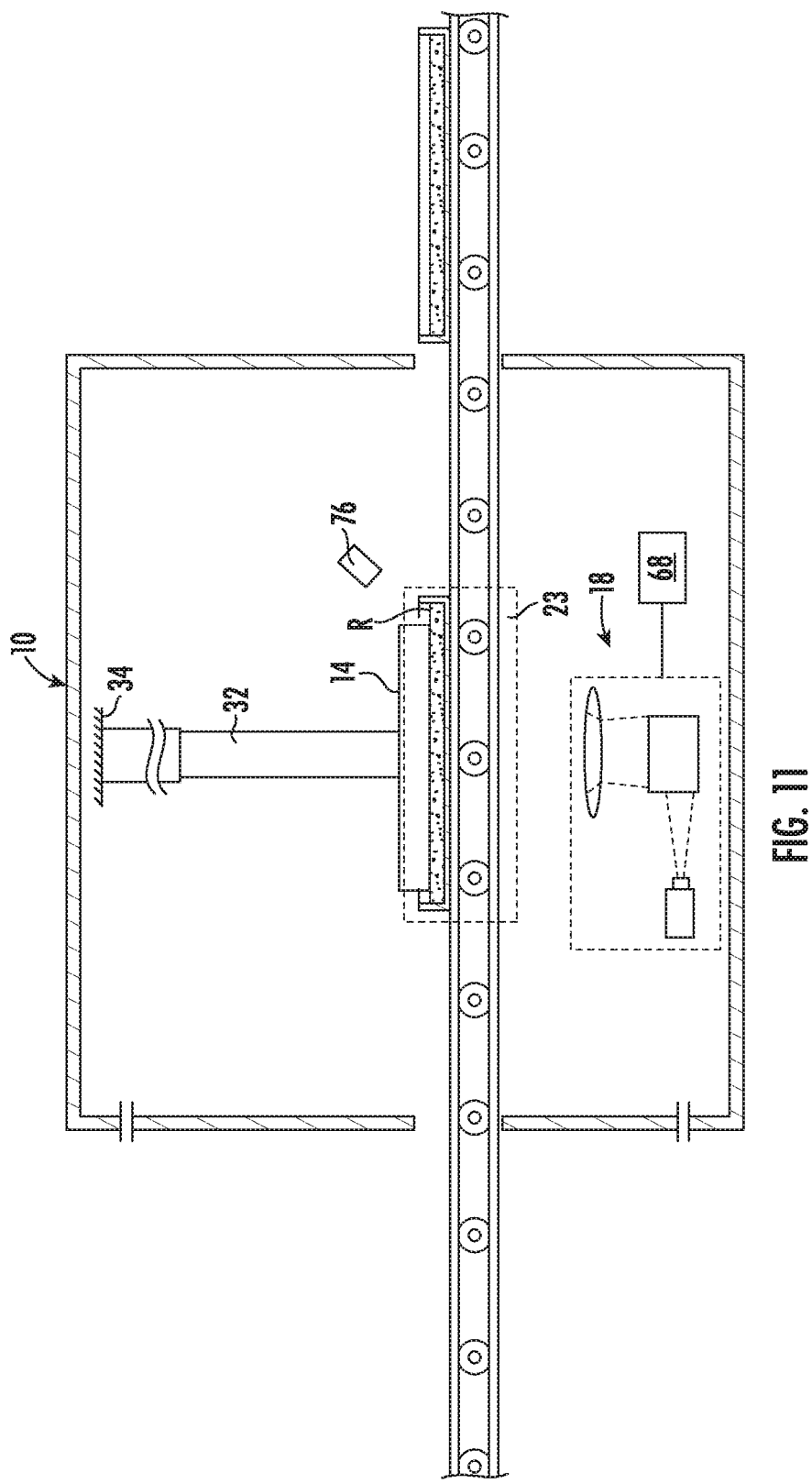

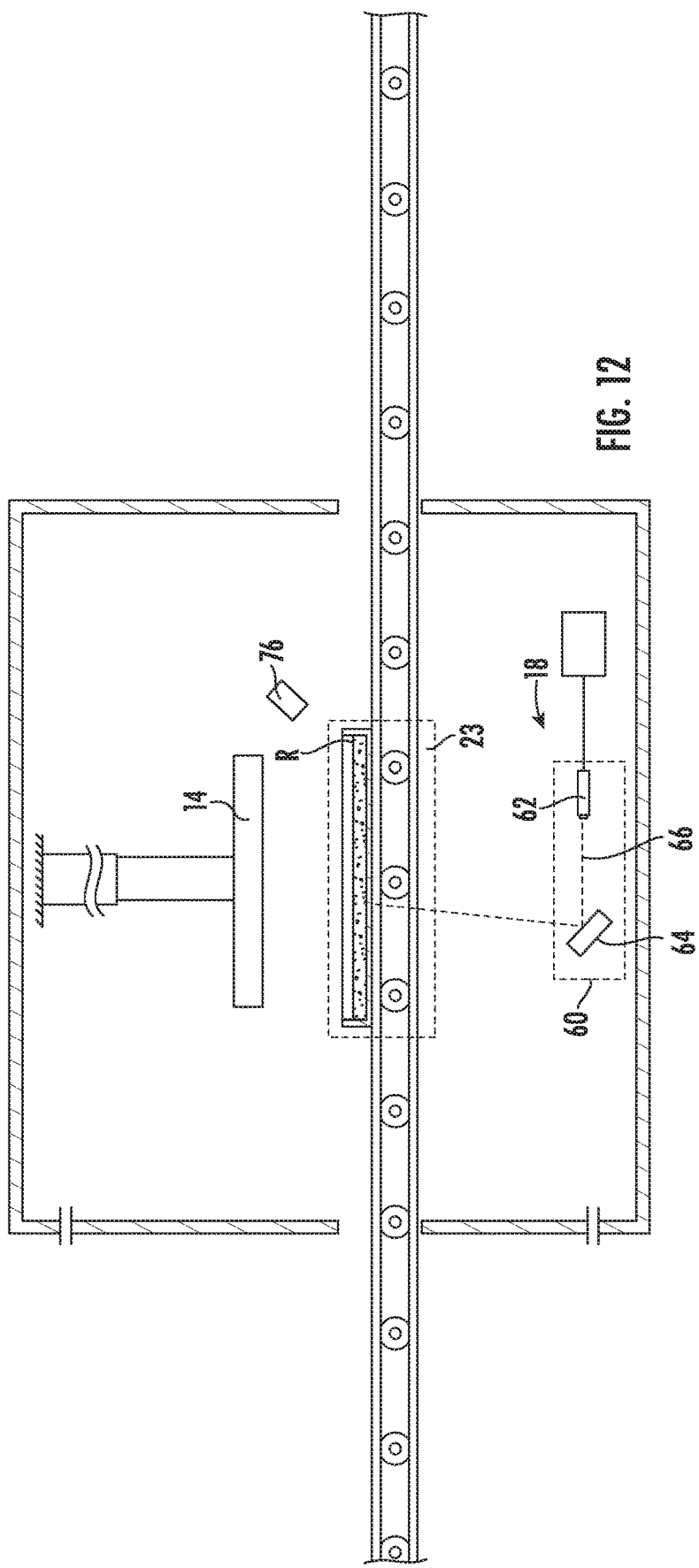

METHOD AND APPARATUS FOR BUILD THICKNESS CONTROL IN ADDITIVE MANUFACTURING

BACKGROUND OF THE INVENTION

This invention relates generally to additive manufacturing, and more particularly to an apparatus and method for determining build layer thickness in additive manufacturing and adjusting a build profile to achieve predetermine final dimensions for a part.

Additive manufacturing is a process in which material is built up layer-by-layer to form a component. Each layer is made in a cycle that includes multiple steps. One prior art method is a tape casting process. In this process, a resin is deposited as a layer having a desired thickness onto a flexible radiotransparent tape that is fed out from a supply reel. A stage, or upper plate, lowers onto the resin, such that a working surface defined by one of a surface of the stage or a surface of the work in process part is positioned such that the working surface either is just touching the resin or compressing it between the tape and the upper plate and defining a layer thickness. Radiant energy is used to cure the resin through the radiotransparent tape. Once the curing of the first layer is complete, the upper plate is retracted upwards, taking the cured material with it. The tape is then advanced to expose a fresh clean section, ready for additional resin to be deposited in a subsequent, new cycle.

Another prior art method employs a vat of liquid radiant-energy curable photopolymer "resin" and a curing energy source such as a laser. Similarly, DLP 3D printing employs a two-dimensional image projector to build components one layer at a time. For each layer, the projector flashes a radiation image of the cross-section of the component on the surface of the liquid or through a transparent object which defines a constrained surface of the resin. Exposure to the radiation cures and solidifies the pattern in the resin and joins it to a previously cured layer to create a build layer. Other types of additive manufacturing processes utilize other types of radiant energy sources to solidify patterns in resin.

The relative positions of the working surface and the resin surface are conventionally defined relative to a component of the additive manufacturing apparatus having a generally fixed location. For example in tape casting the relative positions can be defined by the position of a support platform for the resin layer. However the relative position of the working surface can vary due to variations in build a layer thickness of the cured work in process part. Further variations can be introduced by changes in thickness of the resin layer.

Thus, one problem with conventional methods of additive manufacturing is that the relative positions of the working surface and the surface of the resin can vary from cycle to cycle.

Another problem with conventional methods of additive manufacturing is that errors can accumulate such they adversely affect the final dimensions of a part.

Another problem is that a starting position of the stage might be incorrect.

Another problem is that the thickness of the layer of resin to be cured might be incorrect.

BRIEF DESCRIPTION OF THE INVENTION

At least one of these problems is addressed by an additive manufacturing apparatus configured to determine the relative position of the working surface and the resin surface. More specifically, an apparatus and a method are provided to measure the relative positions of the working surface with respect to the resin surface and adjust the desired build layer thickness accordingly.

According to one aspect of the technology described herein, a method for producing a part layer by layer using an additive manufacturing apparatus. The additive manufacturing apparatus includes a resin support, a stage, a measuring system, and an actuator configured to change the relative position of the stage and the resin support. The method includes the steps of: performing an additive manufacturing cycle including the following steps: depositing an uncured layer of resin; moving the stage to a target location; curing the uncured layer of resin; and moving the stage away from the target location; repeating the additive manufacturing cycle; performing a measuring process wherein the measuring process includes the following steps: using the measuring system to take a measurement indicative of an actual position of a structure; comparing the actual position of the structure to an expected position of the structure to determine an error; and using the error to modify the target location.

According to one aspect of the technology described herein, an additive manufacturing apparatus that includes a resin support, a stage, a radiant energy apparatus, and actuator, and a measuring system. The resin support defines a build surface that is configured to support an uncured layer of resin. The stage is configured to hold a stacked arrangement of one or more cured layers of resin that form a part that defines a surface positioned opposite the stage. The radiant energy apparatus is positioned opposite to the stage such that it is operable to generate and project radiant energy in a predetermined pattern. The actuator is configured to change the relative position of the stage and the resin support. The measuring system is configured for measuring the position of one or more structures relative to the resin support. By way of example and not limitation, the structure is one of the following: the stage, a surface of the uncured layer of resin, a surface of the part, and a combination thereof.

According to one aspect of the technology described herein, a method for forming a part using an additive manufacturing apparatus that includes a resin support configured to support an uncured layer of resin within a build zone, a stage configured to hold a stacked arrangement of one or more cured layers of resin that form at least a portion of the part, a measuring system, and an actuator configured to change the relative position of the stage and the resin support, the method comprising the steps of: operating the additive manufacturing apparatus in accordance with a build profile to create a cured build layer of a part; measuring a dimension of the part using the measuring system; determining whether the dimension includes an error; responding to the determination of an error by modifying the build profile to include a compensation layer wherein the thickness of the compensation layer is chosen to compensate for the error.

BRIEF DESCRIPTION OF THE DRAWINGS

The invention may be best understood by reference to the following description taken in conjunction with the accompanying drawing figures in which:

FIG. 9 shows the results of two cycles of an additive manufacturing method according to the disclosed technology;

FIG. 11 shows a single layer vat-based additive manufacturing apparatus wherein a layer of resin is being further defined by contact with a stage; and FIG. 12 is a view of the single layer vat-based additive manufacturing apparatus of FIG. 11 showing an alternative curing mechanism utilized in the vat-based additive manufacturing apparatus of FIG. 10.

DETAILED DESCRIPTION OF THE INVENTION

Figure 1:
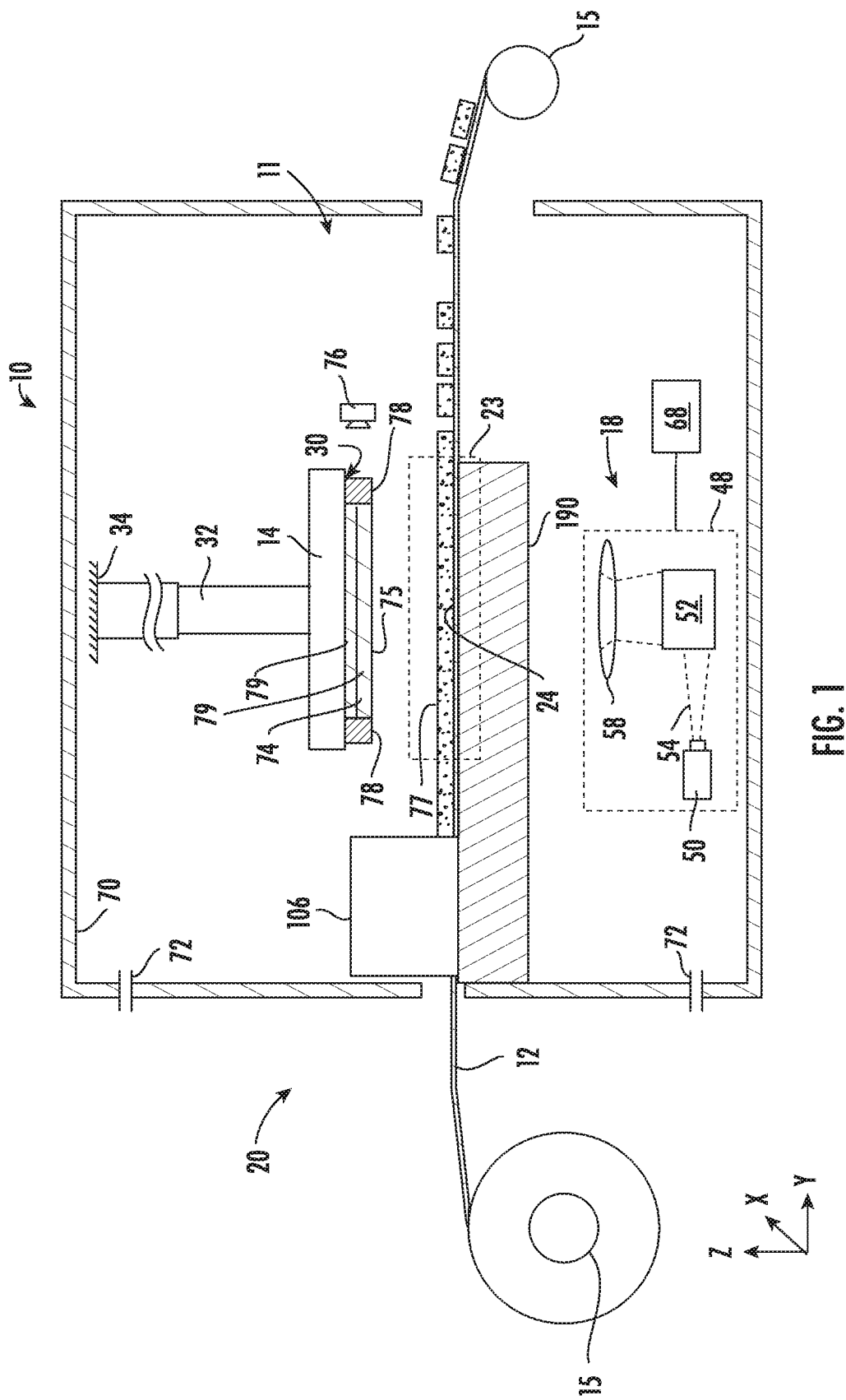
FIG. 1 is a schematic side elevation view of an exemplary tape casting additive manufacturing apparatus that includes a device for measuring the position of a structure.

Referring to the drawings wherein identical reference numerals denote the same elements throughout the various views, FIG. 1 illustrates schematically an example of one type of suitable apparatus 10 for additive manufacturing with improved build layer control and thus improved accuracy with regards to final part thickness. A method is provided below for utilizing the apparatus 10 to monitor part geometry via part thickness as the part is built and for modifying a build profile to correct for errors that might occur during the build process. As used herein, the term "build profile" refers to an instruction or set of instructions utilized to operate the apparatus 10 to utilize additive manufacturing to build a group of layers to together define a part having predetermined final dimensions.

Figure 2:
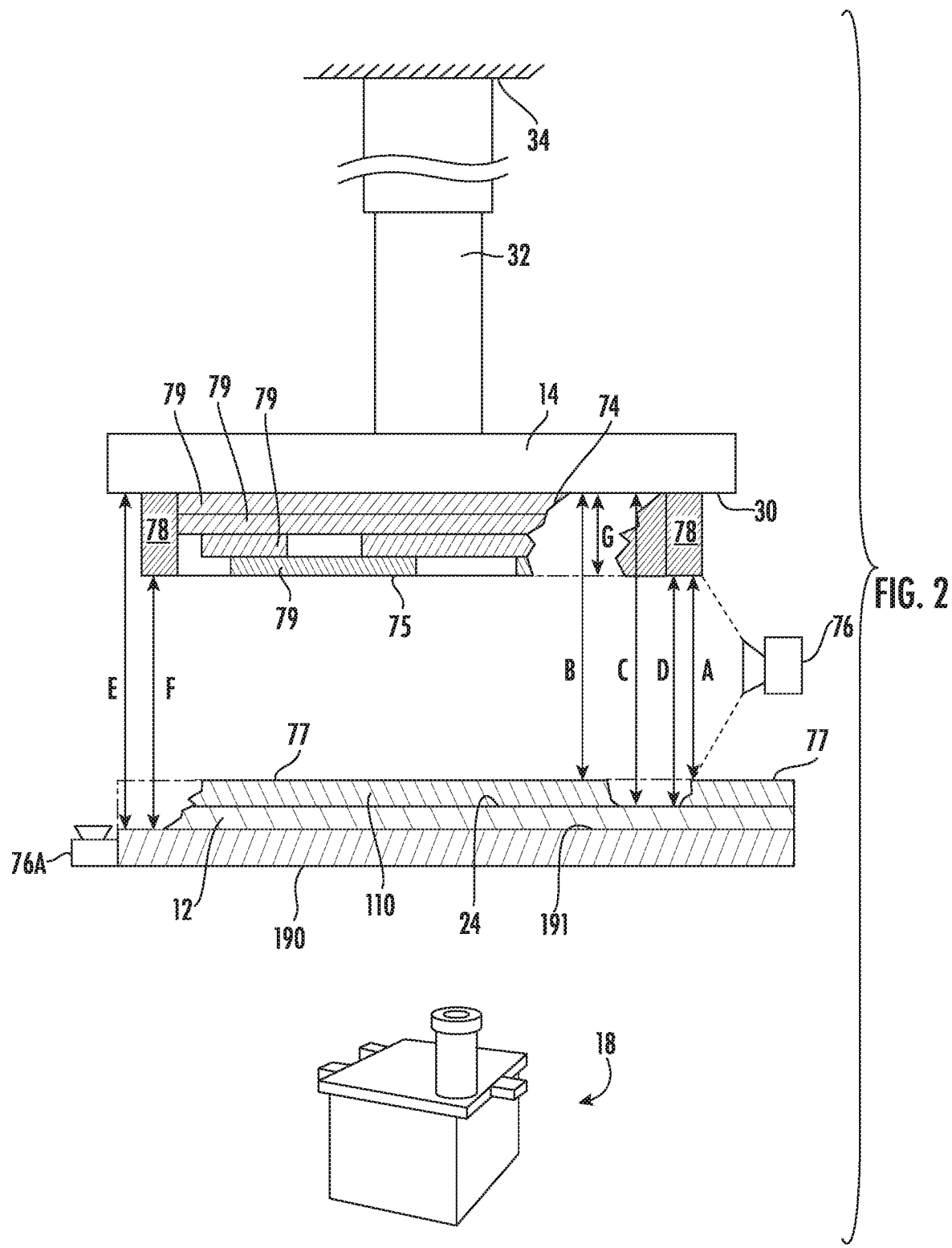
FIG. 2 is a schematic view of one embodiment of a portion of the tape casting additive manufacturing apparatus shown in FIG. 1.

Apparatus 10 includes a resin handling assembly 11 which, according to the illustrated embodiment, is a tape casting device 20. Resin handling assembly 11 includes a device 76 that is configured to determine the relative positions of a working surface 75 and a resin surface 77. A device 76 is shown in FIG. 2 with reference number 76A to indicate one possible alternative position for the device 76.

Figure 3:
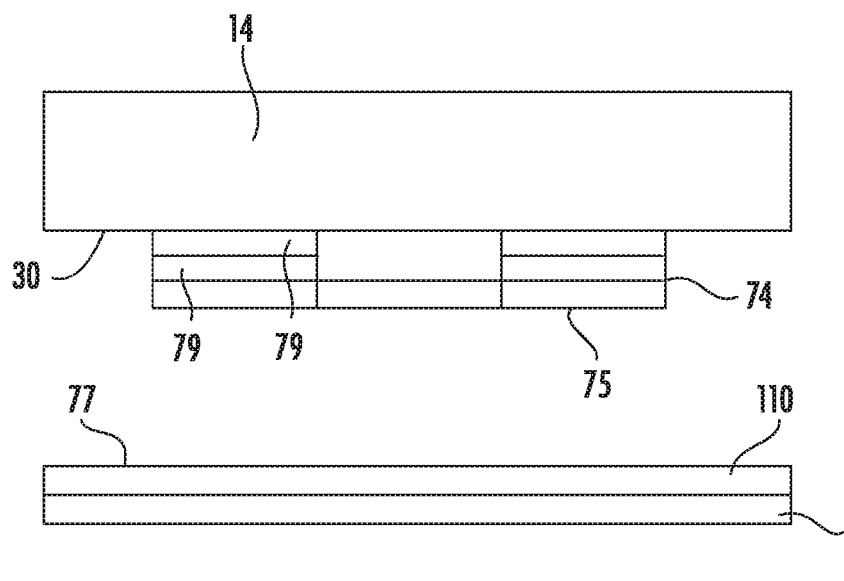
FIG. 3 shows a stylized representation of the initial relative positions of a stage and the platform in an additive manufacturing apparatus.
Figure 4:
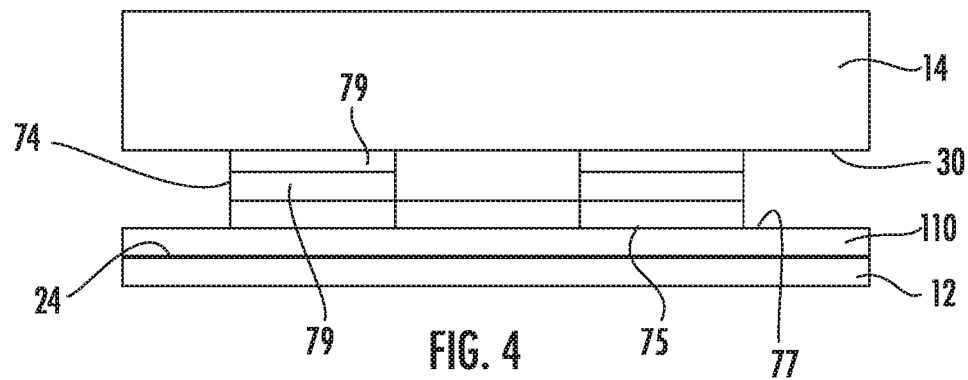
FIG. 4 shows a further relative position of the stage and platform in FIG. 3.
Figure 5:
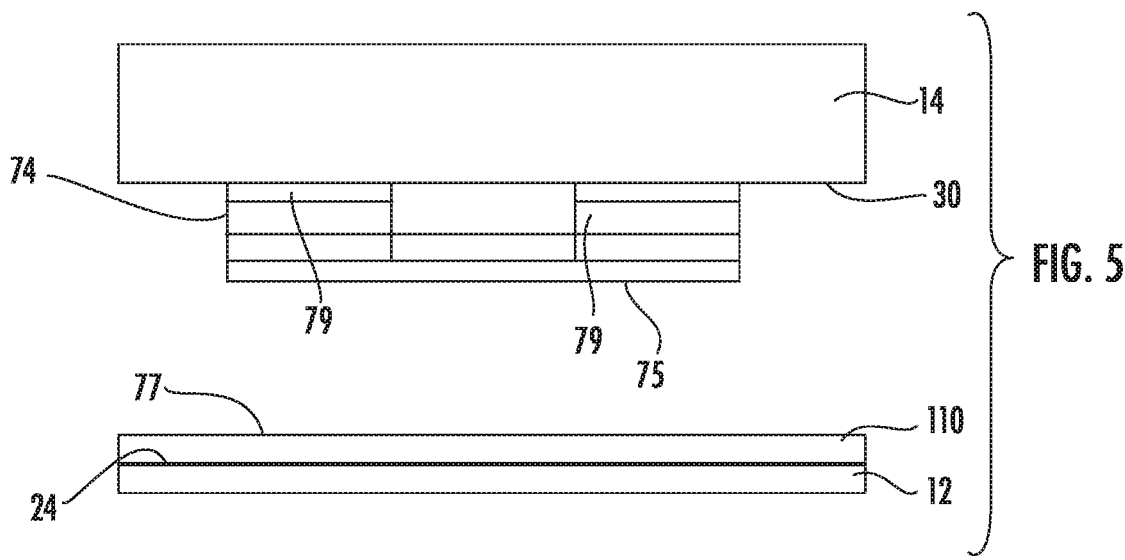
FIG. 5 shows a further relative position of the stage and platform in FIG. 3.

Referring to FIGS. 3-8, the disclosed technology is suitable for reducing the number and magnitude of errors and imprecise build layer development that occur with conventional additive manufacturing apparatuses and methods. Such apparatuses and methods do not take into account the actual relative positions of critical surfaces such as the working surface 75 and the resin surface 77. As will be described in detail below but is being described here in order to highlight the errors that the disclosed technology address, an additive manufacturing apparatus includes a stage 14. Referring now to FIG. 3, the stage 14 defines a surface 30 on which a part 74 is formed. The part 74 defines a surface 75 on which a new layer of the part is added by transfer of a cured portion of the layer 110 of resin positioned adjacent the surface 75 and supported by the film 12. The layer 110 defines the resin surface 77. As shown in FIG. 4, error-free operation involves a predetermined amount of contact between the surface 75 and the surface 77. The predetermined amount of contact results in transfer of a cured portion of the layer 110 to form a new build layer 79 of the part 74 and defines a new surface 75. A new portion of layer 110 is moved below the part 74 to define a new surface 77. This configuration is shown in FIG. 5.

Figure 6:
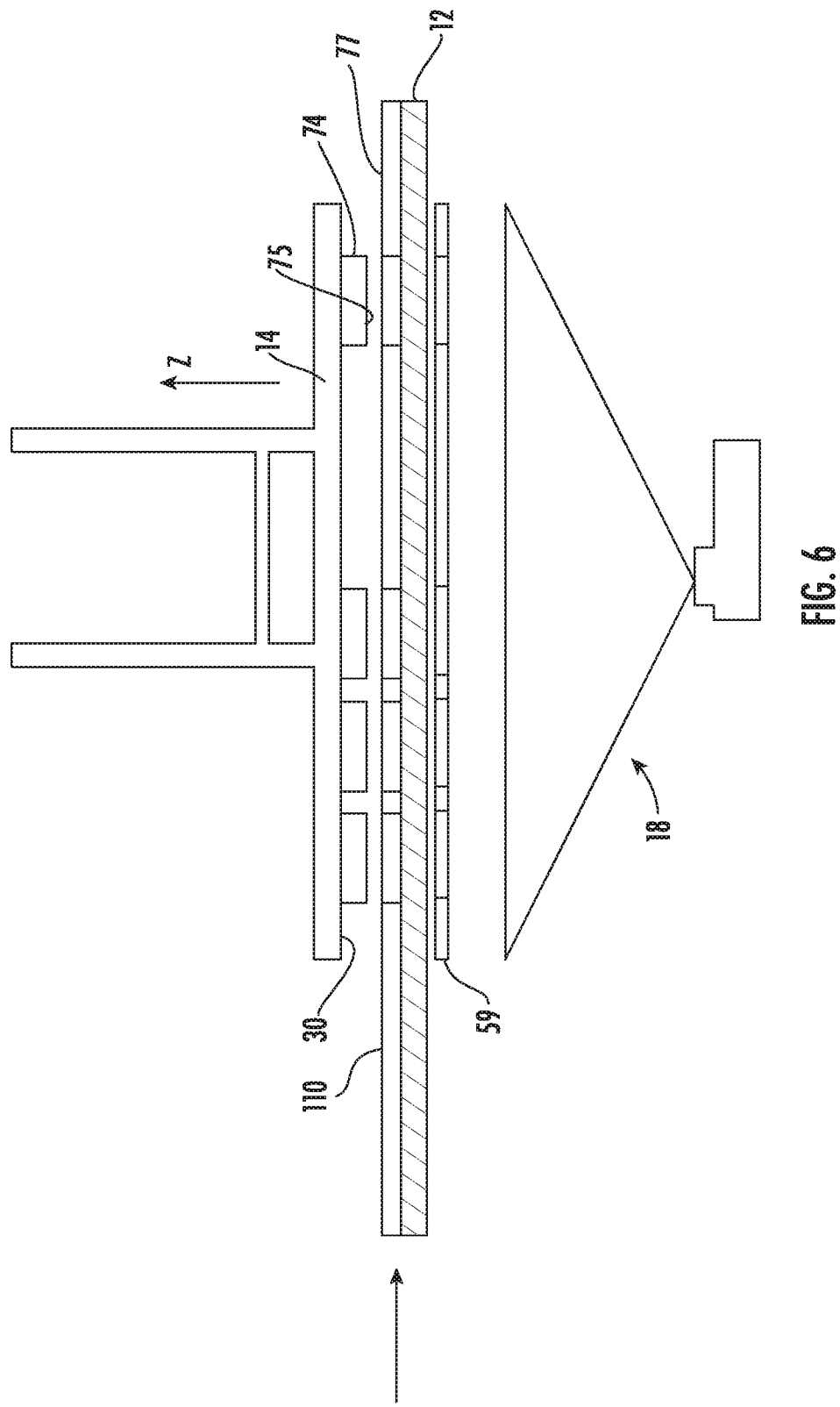
FIG. 6 shows a stylized representation of a failure mode.
Figure 7:
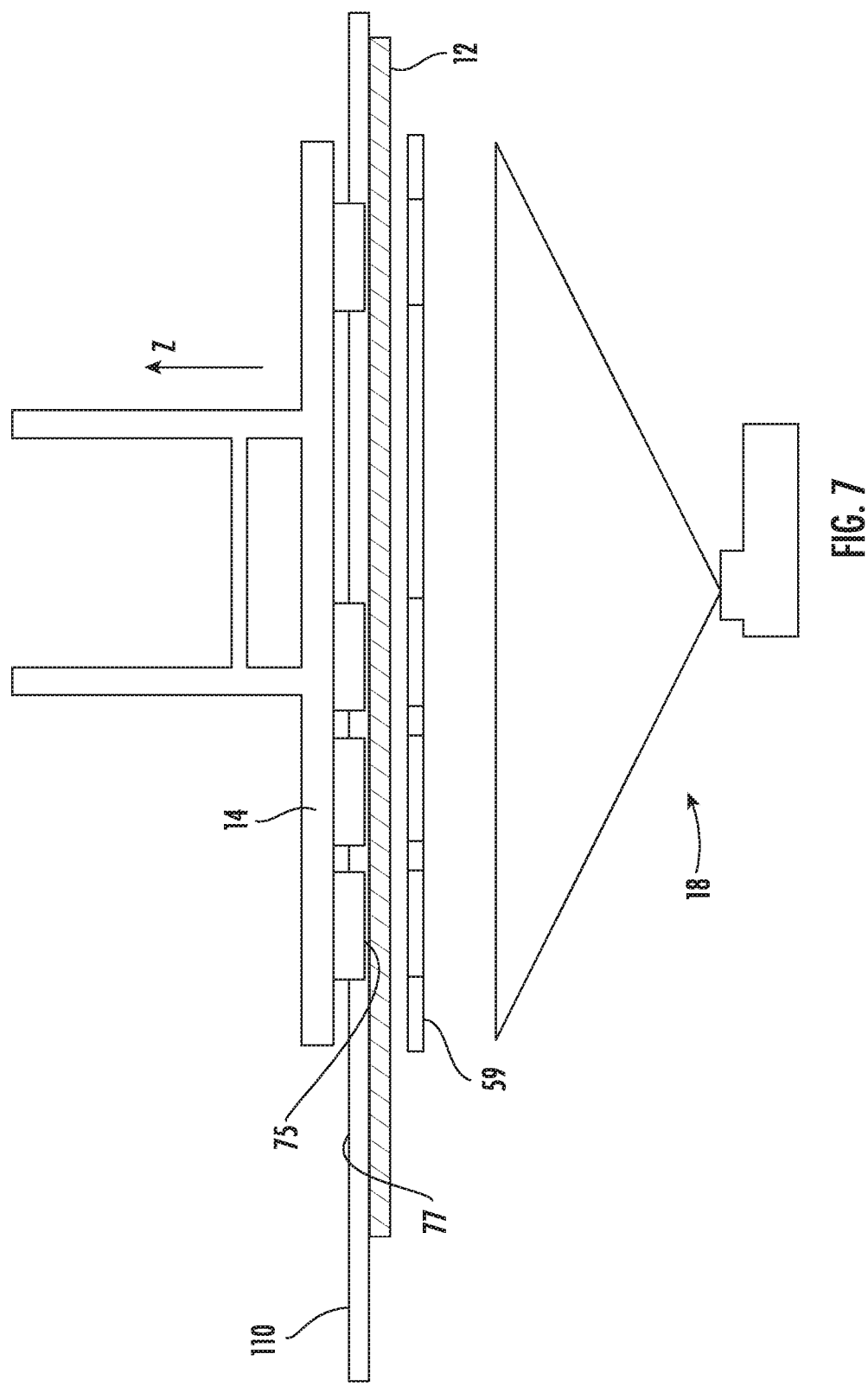
FIG. 7 shows a stylized representation of a failure mode.

There are at least two types of errors that are typical when considering the formation of a single build layer 79. As illustrated in FIG. 6, the layer 110 is not thick enough to allow the surface 77 to contact the surface 75 when the stage 14 and the part 74 are moved into a build position appropriate for the existing geometry of the part 74. In this case, the cured portion of the layer 110 does not transfer to the part 74. In a second error condition (shown in FIG. 7), the layer 110 is too thick such that when the stage 14 and the part 74 are moved into a build position appropriate for the existing geometry of the part 74, the surface 75 actually penetrates the surface 77 causing malformation of the part and potentially also damaging the part.

Figure 8:
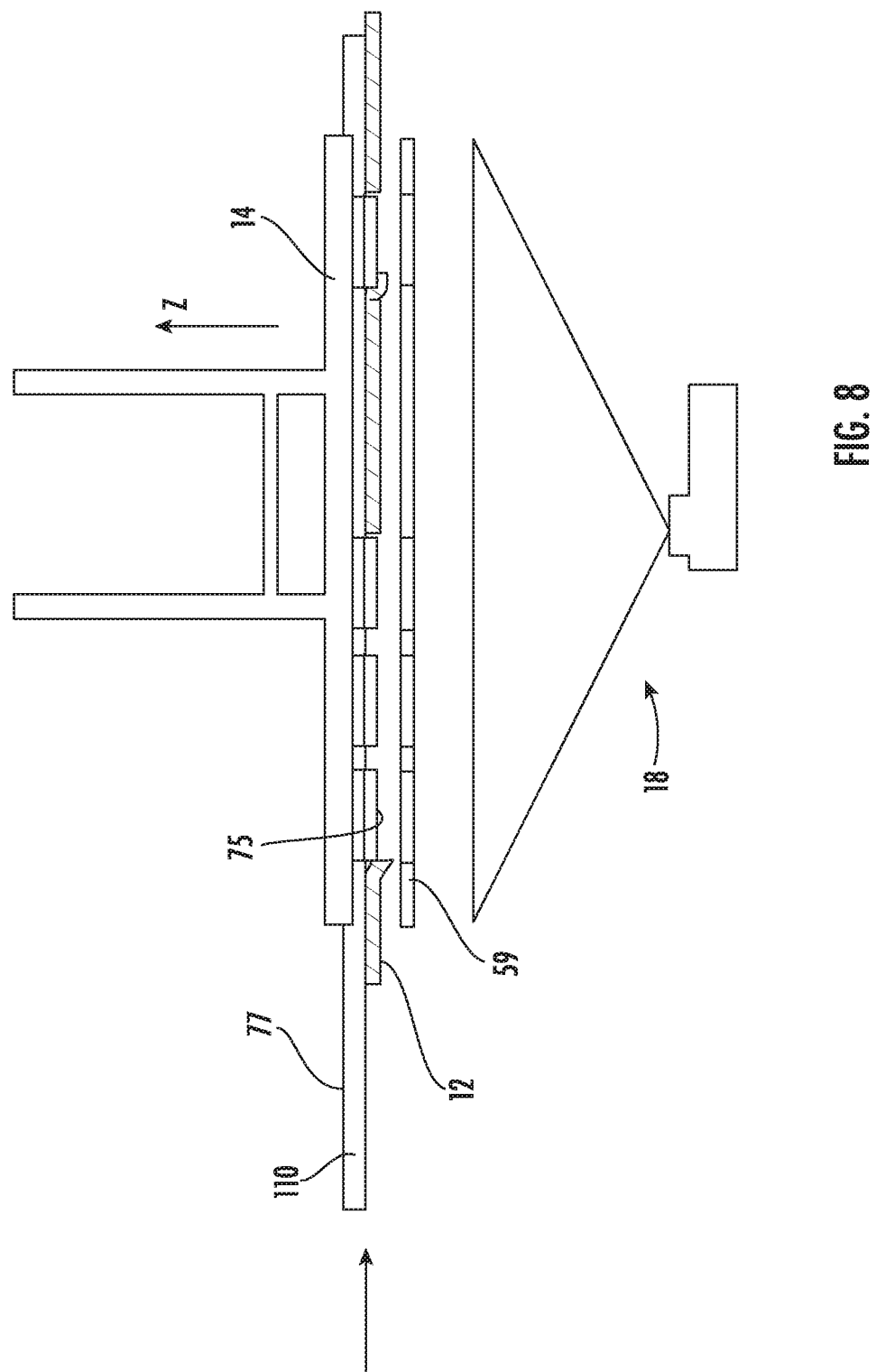
FIG. 8 shows a stylized representation of another failure mode.

There are at least three types of errors that are typical when considering layer-based errors that influence the formation of an entire part. In a third error condition, also shown in FIG. 6, errors in the thickness of previous layers 110 have resulted in a series of layers 79 of part 74, some or all of which are too thin (a further example of this is shown in FIG. 9 and discussed in detail below). As a result, the part 74 is not as tall as expected and when the stage 14 is moved into a build position that is appropriate for the expected geometry, the surface 75 does not contact the material layer 110 if the thickness of material layer 110 is as thick as expected or thinner. In a fourth error condition, also shown in FIG. 7, errors in the thickness of previous build layer 79 have resulted in a series of layers, some or all of which are too thick. Thus, the part 74 is taller than expected such that when the stage 14 is moved into a build position that is appropriate for the expected geometry, the surface 75 penetrates the surface 77 causing malformation of or damage to the part. In a fifth error condition, shown in FIG. 8, errors in thickness of previous build layer 79 have resulted in a part 74 that is much taller than expected. Thus, when the stage 14 is moved into a build position, the stage 14 is lowered so far such that it "crashes" into the layer 110, damaging the part. It can also push the part 74 through the material layer 110 to contact the film 12 or even to push through the film 12 to damage the machine. As shown in FIG. 8, the film 12 has contacted the part 74 with such force that the film 12 has been separated in several locations resulting a web breakage or break-out. The disclosed technology addresses these errors by providing an apparatus and method for accurately defining the thickness of the layer 110 to enable the part 74 to be constructed correctly.

It will be understood that configurations of the equipment other than tape casting can be used in apparatus 10 and can carry out a method described below. Those other configurations include different types of resin handling equipment such as vats and/or plates. The method is adaptable for use with lower viscosity resins, slurries, and pastes, as well as higher viscosity resins and/or powders. It will be understood that other configurations of equipment may be used to carry out the method. Basic components of the exemplary apparatus 10 include a material depositing device 106 and the resin handling assembly 11 which in FIG. 1 is the tape casting apparatus 20. The tape casting apparatus 20 includes a support film or tape 12, and a radiant energy apparatus 18.

Referring to FIG. 1, the tape casting apparatus 20 includes spaced apart rollers 15 with the flexible polymeric film 12 extending therebetween. A portion of the film 12 is supported from underneath by a support plate 190. Suitable mechanical supports (frames, brackets, etc.—not shown) would be provided for the rollers 15 and support plate 190. The film 12 is an example of a "resin support".

Both of the support plate 190 and the film 12 are transparent or include a portion or portions that are transparent. As used herein, the term "transparent" refers to a material which allows radiant energy of a selected wavelength to pass through. For example, as described below, the radiant energy used for curing could be ultraviolet light or laser light in the visible spectrum. Non-limiting examples of transparent materials include polymers, glass, and crystalline minerals such as sapphire or quartz.

Appropriate means such as motors, actuators, feedback sensors, and/or controls of a known type (not shown) would be provided for driving the rollers 15 in such a manner so as to maintain the film 12 such that it is appropriately tensioned between the rollers 15 and to wind the film 12 from one of the rollers 15 to another roller 15.

The film 12 extending between the rollers 15 defines a first "build surface" 24 which is shown as being planar, but could alternatively be arcuate (depending on the shape of the support plate). For purposes of convenient description, the first build surface 24 may be considered to be oriented parallel to an X-Y plane of the apparatus 10, and a direction perpendicular to the X-Y plane is denoted as a Z-direction (X, Y, and Z being three mutually perpendicular directions).

The first build surface 24 may be configured to be "non-stick", that is, resistant to adhesion of cured resin. The non-stick properties may be embodied by a combination of variables such as the chemistry of the film 12, its surface finish, and/or applied coatings. In one example, a permanent or semi-permanent non-stick coating may be applied. One non-limiting example of a suitable coating is polytetrafluoroethylene ("PTFE"). In one example, all or a portion of the first build surface 24 may incorporate a controlled roughness or surface texture (e.g. protrusions, dimples, grooves, ridges, etc.) with nonstick properties. In one example, the film 12 may be made in whole or in part from an oxygen-permeable material.

Some means are provided for applying or depositing resin R to the first build surface 24 in a generally uniform layer. FIG. 1 shows schematically the material depositor 106 configured for this purpose.

The apparatus 10 includes a stage 14 that is a structure defining the planar surface 30 which is capable of being oriented parallel to the build surface 24 of the portion of the film 12 positioned over the support plate 190. Some means are provided for moving the stage 14 relative to the build surface 24, parallel to the Z-direction. In FIG. 1, these means are depicted schematically as a simple actuator 32 connected between the stage 14 and a stationary support structure 34, with the understanding that devices such as pneumatic cylinders, hydraulic cylinders, ball screw electric actuators, linear electric actuators, or delta drives may be used for this purpose. In addition to, or as an alternative to, making the stage 14 movable, the film 12 and/or the support plate 190 could be movable parallel to the Z-direction.

The apparatus 10 includes a radiant energy apparatus 18 that is configured to cure at least a portion of the layer 110. The radiant energy apparatus 18 may comprise any device or combination of devices operable to generate and project radiant energy on the resin R in a suitable pattern and with a suitable energy level and other operating characteristics to cure the resin R during the build process, described in more detail below.

In one exemplary embodiment as shown in FIG. 1, the radiant energy apparatus 18 may comprise a "projector" 48, used herein generally to refer to any device operable to generate a radiant energy patterned image of suitable energy level and other operating characteristics to cure the resin R. As used herein, the term "patterned image" refers to a projection of radiant energy comprising an array of individual pixels. Non-limiting examples of patterned imaged devices include a DLP projector or another digital micromirror device, a 2D array of LEDs, a 2D array of lasers, or optically addressed light valves. In the illustrated example, the projector 48 comprises a radiant energy source 50 such as a UV lamp, an image forming apparatus 52 operable to receive a source beam 54 from the radiant energy source 50 and generate a pattern image 59 (FIGS. 6-8) to be projected onto the surface of the resin R, and optionally focusing optics 58, such as one or more lenses.

The radiant energy source 50 may comprise any device operable to generate a beam of suitable energy level and frequency characteristics to cure the resin R. In the illustrated example, the radiant energy source 50 comprises a UV flash lamp.

The image forming apparatus 52 may include one or more mirrors, prisms, and/or lenses and is provided with suitable actuators, and arranged so that the source beam 54 from the radiant energy source 50 can be transformed into a pixelated image in an X-Y plane coincident with the surface of the resin R. In the illustrated example, the image forming apparatus 52 may be a digital micro-mirror device. For example, the projector 48 may be a commercially-available Digital Light Processing ("DLP") projector.

As an option, the projector 48 may incorporate additional means such as actuators, mirrors, etc. configured to selectively move the image forming apparatus 52 or other part of the projector 48, with the effect of rastering or shifting the location of the patterned image 59 (shown in FIGS. 6-8) relative to the build surface 24. Stated another way, the patterned image may be moved away from a nominal or starting location. This permits a single image forming apparatus 52 to cover a larger build area, for example. Means for rastering or shifting the patterned image from the image forming apparatus 52 are commercially available. This type of image projection may be referred to herein as a "tiled image".

In another exemplary embodiment (as shown in FIG. 12 in relation to a vat based resin transport system discussed further below), in addition to other types of radiant energy devices, the radiant energy apparatus 18 may comprise a "scanned beam apparatus" 60 used herein to refer generally to refer to any device operable to generate a radiant energy beam of suitable energy level and other operating characteristics to cure the resin R and to scan the beam over the surface of the resin R in a desired pattern. In the illustrated example, the scanned beam apparatus 60 comprises a radiant energy source 62 and a beam steering apparatus 64.

The radiant energy source 62 may comprise any device operable to generate a beam of suitable power and other operating characteristics to cure the resin R. Non-limiting examples of suitable radiant energy sources include lasers or electron beam guns.

The beam steering apparatus 64 may include one or more mirrors, prisms, and/or lenses and may be provided with suitable actuators, and arranged so that a beam 66 from the radiant energy source 62 can be focused to a desired spot size and steered to a desired position in plane coincident with the surface of the resin R. The beam 66 may be referred to herein as a "build beam". Other types of scanned beam apparatus may be used. For example, scanned beam sources using multiple build beams are known, as are scanned beam sources in which the radiant energy source itself is movable by way of one or more actuators.

The apparatus 10 may include a controller 68. The controller 68 in FIG. 1 is a generalized representation of the hardware and software required to control the operation of the apparatus 10, the stage 14, the radiant energy apparatus 18, the transport mechanism 20, the depositor 106, and the various actuators described above. The controller 68 may be embodied, for example, by software running on one or more processors embodied in one or more devices such as a programmable logic controller ("PLC") or a microcomputer. Such processors may be coupled to sensors and operating components, for example, through wired or wireless connections. The same processor or processors may be used to retrieve and analyze sensor data, for statistical analysis, and for feedback control.

Optionally, the components of the apparatus 10 may be surrounded by a housing 70, which may be used to provide a shielding or inert gas atmosphere using gas ports 72. Optionally, pressure within the housing 70 could be maintained at a desired level greater than or less than atmospheric. Optionally, the housing 70 could be temperature and/or humidity controlled. Optionally, ventilation of the housing 70 could be controlled based on factors such as a time interval, temperature, humidity, and/or chemical species concentration.

The resin R comprises a material which is radiant-energy curable and which is capable of adhering or binding together the filler (if used) in the cured state. As used herein, the term "radiant-energy curable" refers to any material which solidifies in response to the application of radiant energy of a particular frequency and energy level. For example, the resin R may comprise a known type of photopolymer resin containing photo-initiator compounds functioning to trigger a polymerization reaction, causing the resin to change from a liquid state to a solid state. Alternatively, the resin R may comprise a material which contains a solvent that may be evaporated out by the application of radiant energy. The uncured resin R may be provided in solid (e.g. granular) or liquid form including a paste or slurry.

According to the tape casting embodiment shown, the viscosity of the resin R is at a higher viscosity such that contact with a doctor blade or a leveling device (such as the stage 14) is required. The composition of the resin R may be selected as desired to suit a particular application. Mixtures of different compositions may be used.

The resin R may be selected to have the ability to out-gas or burn off during further processing, such as the sintering process described below.

The resin R may incorporate a filler. The filler may be pre-mixed with resin R. The filler comprises particles, which are conventionally defined as "a very small bit of matter". The filler may comprise any material which is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used.

The filler may be "fusible", meaning it is capable of consolidation into a mass upon via application of sufficient energy. For example, fusibility is a characteristic of many available powders including but not limited to: polymeric, ceramic, glass, and metallic.

The proportion of filler to resin R may be selected to suit a particular application. Generally, any amount of filler may be used so long as the combined material is capable of flowing and being leveled, and there is sufficient resin R to hold together the particles of the filler in the cured state.

Examples of the operation of the apparatus 10 will now be described in detail with reference to FIGS. 1 and 2. It will be understood that, as a precursor to producing a component and using the apparatus 10, the component 74 is software modeled as a stack of planar layers 79 arrayed along the Z-axis. Depending on the type of curing method used, each layer may be divided into a grid of pixels. The actual component 74 may be modeled and/or manufactured as a stack of dozens or hundreds of layers. Suitable software modeling processes are known in the art.

Figure 10:
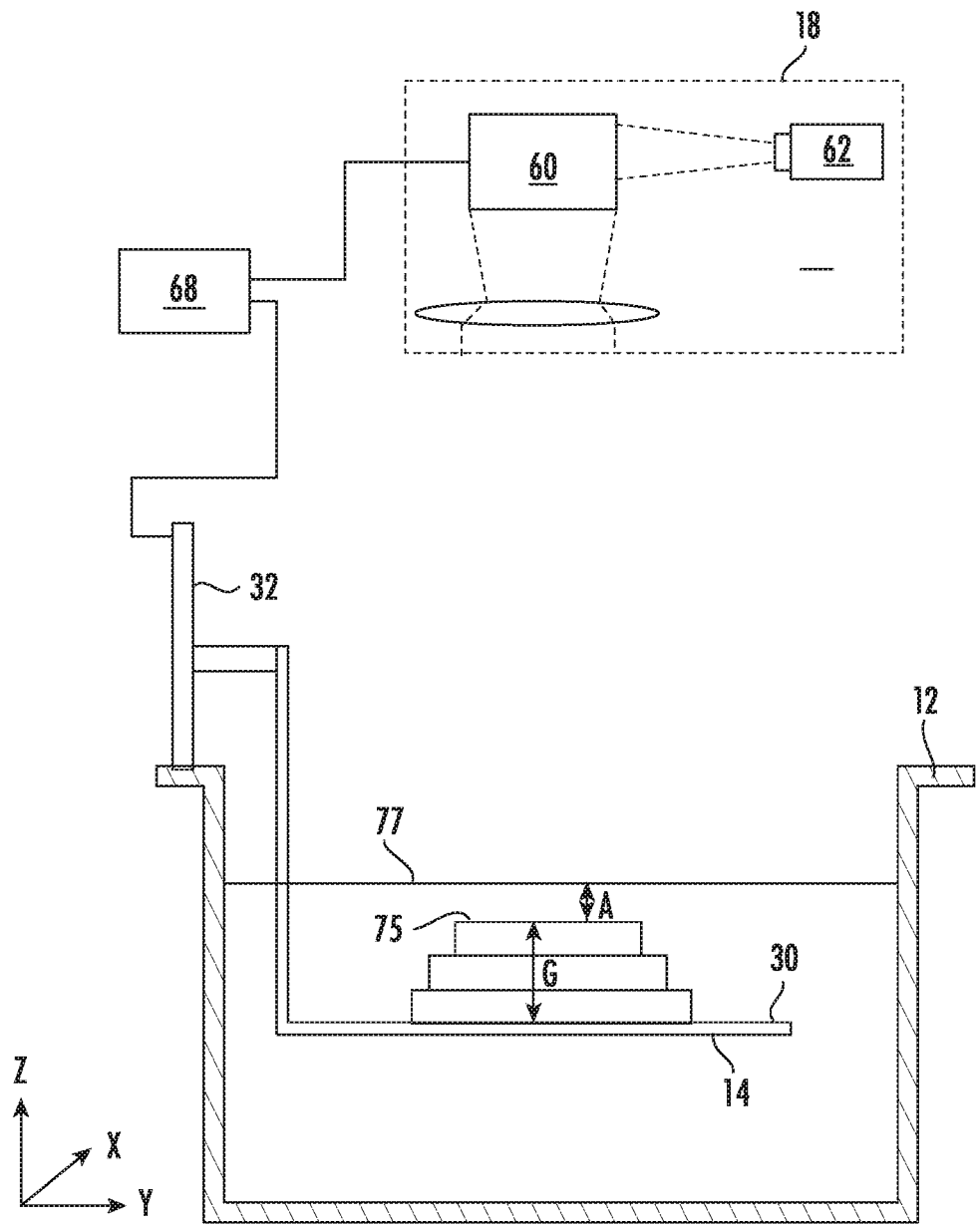
FIG. 10 is a schematic view of a portion of a vat-based additive manufacturing apparatus showing the relative positions of a working surface and a resin surface.

The resin handling assembly 11 is operated to provide new resin R in the build zone 23. After the material is deposited, the apparatus 10 is positioned to define a selected layer increment. The layer increment is defined by some combination of the thickness of the deposited layer and the operation of the stage 14. For a vat system as shown in FIG. 10, it would be the depth in the vat to which the resin is filled.

For example, the stage 14 could be positioned such that the surface 30 for new parts or the existing surface 75 for parts in process is just touching the applied resin R as shown in FIG. 11, or the stage 14 could be used to compress and displace the resin R to positively define the layer increment. The layer increment affects the speed of the additive manufacturing process and the resolution of the component 74. The layer increment can be variable, with a larger layer increment being used to speed the process in portions of a component 74 not requiring high accuracy, and a smaller layer increment being used where higher accuracy is required, at the expense of process speed.

As indicated above, the apparatus 10 includes a measuring system 76. The measuring system 76 is configured to determine the location of structure within apparatus 10. As illustrated, measuring system 76 can be configured to determine distance between structure. Such distances can be used as will be described further below to determine the thickness, i.e., layer increment, of a new build layer 79.

The layer increment is ultimately defined utilizing knowledge of the relative positions in the Z direction of the working surface 75 and the resin surface 77 (shown as distance a in FIG. 2). It should be appreciated that determining relative positions of the working surface 75 and the resin surface 77 can be done in light of a reference position such as a contact surface 191 of the support 190. Thus the location of the Z direction of the surface 191 of the support 190 is defined as 'Z=zero. The location of the resin surface 77 relative to the contact surface 191 is the combined thickness of the film 12 and the thickness of the resin layer 110. For the purposes of the technology disclosed herein it can be assumed that the thickness of the film 12 and the thickness of the resin layer 110 are both constant. Thus the position of the resin surface 77 relative to a reference such as the support 190 is constant. It should be appreciated that during normal operation, the position of the resin surface 77 can vary due to variations in the thickness of layer 110. Such variations can occur in the machine direction (MD) along the Y-axis and in the transverse direction (TD) along the X-axis.

Once the resin R has been applied and the layer increment defined, the radiant energy apparatus 18 is used to cure a two-dimensional cross-section or layer of the component 74 being built as shown in FIG. 3.

Where a projector 48 is used, the projector 48 projects the patterned image 59 representative of the cross-section of the component 74 through the film 12 to the resin R. This process is referred to herein as "selective" curing.

Once curing of the first layer is complete, the stage 14 is separated from the film 12, for example by raising the stage 14 using the actuator 32. It will be understood that the resin R and/or cured layer do not necessarily join, stick, or bond with the surface of the film 12. Accordingly, as used herein the term "separate" refers to the process of moving two elements apart from each other and does not necessarily imply the act of breaking a bond or detaching one element from another. A reference block 78 can be utilized according to one aspect of the method described below in the process of measuring.

The reference block 78 is illustrated in FIGS. 1 and 2 is a set of cured layers positioned adjacent the part 74 and as illustrated, representative of the thickness of part 74 at a maximum location. In this regard, the block 78 is formed by the curing of a thickness of resin equivalent to the maximum thickness of each build layer 79. The block 78 can be a frame surrounding the part 74 as shown to be removed when part 74 is finished. Or the reference block 78 can be a discrete block or blocks positioned around the perimeter of the part 74, to be removed when part 74 is finished.

It should be appreciated that in some embodiments the build block 78 represents a height that is different than the thickness of part 74 at a maximum location. In this regard, the build block 78 can represent a height that is equivalent to the height and a predetermined location within the perimeter of the boundaries of part 74. Stated another way, the build block 78 can represent a height at a point a predetermined distance along a line at a predetermined X or Y coordinate. Thus the build block 78 can represent a height at predetermined XY and Z coordinates. Because the build block 78 can be constructed to vary in height along the X and Y coordinates it can represent different heights and thus different XYZ coordinate combinations. The build block 78 can be a monolithic structure as illustrated. Alternatively, the build block 78 can be multiple structures.

The present invention can be better understood by a description of the operation thereof. According to one aspect of the technology described herein, a method for producing a part 74 layer by layer using an additive manufacturing apparatus 10 is provided. As indicated above, the additive manufacturing apparatus 10 includes the resin support 190, the stage 14, the measuring system 76, and the actuator configured 32 to change the relative position of the stage 14 and the resin support 190. The method includes the steps of: performing an additive manufacturing cycle which includes the following steps: depositing an uncured layer of resin 110; moving the stage 14 to a target location (such as a predetermined distance from surface 191 of the resin support 190); double checking the actual position of the stage 14 by using the measuring system 76 to determine an actual location of the stage 14 and comparing that actual location to the target location; if the stage 14 is not within predetermined limits from the target location repeat this step of moving the stage 14 to a target location; after one or more movements of the stage 14, curing the uncured layer of resin 110; and moving the stage 14 away from the target location; repeating the additive manufacturing cycle; performing a measuring process wherein the measuring process includes the following steps: using the measuring system 76 to take a measurement indicative of an actual position of a structure relative to the resin support 190; comparing the actual position of the structure to an expected position of the structure to determine an error; and using the error to modify the target location.

Referring now to additional steps that can be performed with the above described method, it should be appreciated that the step of performing a measuring process can be performed every cycle. And it follows that the step of performing the step of using the error can be perform every cycle during which a measuring process is performed. As indicated above, an error is determined each time that the measurement step is performed by comparing the actual position of the structure to the desired position of the structure. For example, if the actual position is expressed as a measure of distance, and the actual distance is compared to a desired distance or setpoint distance. An accumulated error is determined utilizing multiple steps of using the measuring system by adding subsequent step errors to the sum of all previous errors. Optionally, the accumulated error can be determined by single measurement of part thickness which will capture the total error accumulated in building of the part.

The structure to be measured can be any one or more of the stage 14, a surface of the uncured layer of resin 77, a surface 75 of the part 74, the surface of the film 12, the surface 30 of the stage 14, and a combination thereof. As indicated above, preferably the reference point is the resin support structure 190 and more particularly, the surface 24 of the resin support structure. It should be appreciated that the thickness of the film 12 is accounted for by conventional methods. Measurements taken with regard to a particular reference point such as structure 190 are used to determine the relative positions of structures as is conventionally known.

Referring now to FIG. 2 the following table identifies various measurements that might be used in the method above as shown in FIG. 2. The measurements indicated are examples and other measurements could be utilized. It should be appreciated that typically these measurements would be expressed as distances, however they could be expressed using a coordinate system utilizing the X, Y, and Z axes indicated above having a common predetermined origin.

| DISTANCE | UPPER STRUCTURE | LOWER STRUCTURE |
| --- | --- | --- |
| A | Working surface 75 | Resin surface 77 |
| Be | Surface 30 of stage 14 | Resin surface 77 |
| C | Surface 30 of stage 14 | Surface of film 12 |
| D | Working surface 75 | Surface of film 12 |
| E | Surface 30 of stage 14 | Surface 24 of support structure 190 |
| F | Working surface 75 | Surface 24 of support structure 190 |
| G | Surface 30 of stage 14 | Reference block 78 |

It is anticipated that a common measurement utilized in the above described method would be the distance A. For example, the target location would be that location determined by movement of the desired structure the predetermined distance, A. The predetermined distance A is the distance between the surface 75 of the part 74 which can be defined by the reference block 78 used to indicate a particular XYZ coordinate of the surface 75 as discussed above. Thus movement of the stage 14 the distance A would position the surface 75 such that it is immediately adjacent to the surface 77 of the resin 110. The movement of the stage 14 further than distance A would result in the surface 75 being pushed into the layer 110 to at least partially displace the surface 77. As indicated above, in this way a desired thickness of layer 110 can be defined immediately prior to curing.

Another common measurement used is the height of a part 74 relative to the surface 30 of the stage 14 "distance G". The distance G can be used as described in further detail below in a description of a method for controlling final part height.

Optionally, the predetermined distances can be determined not point-to-point, but by an average of the actual locations or distances of multiple points of the surface to be measured. In this regard, the measuring system 76 is configured to determine a plane of the structure by measuring the distance of multiple locations on the structure. It should be appreciated that the locations used to determine an average distance can be varied from cycle to cycle. In this regard, the measuring system can be configured to measure a first set of multiple locations after the first cycle and measure a second set of multiple locations after a second cycle and wherein the second set of multiple locations is different than the first set of multiple locations.

The measurement system 76 is configured to generate a signal indicative of position or distances indicated above. The signal can be utilized by the computer 68 as a portion of a closed control loop in which the signal is feedback. The closed control loop is configured to adjust the height, as determined relative to a reference such as the resin support structure 190, of the stage 14 relative to an expected height. The expected height can be considered the setpoint in the control loop. The setpoint can be determined based upon an adjusted distance equal to a predetermined layer thickness plus an amount equal to accumulated error. The setpoint can be adjusted for each cycle to accommodate the error. Or optionally, the setpoint can be adjusted after a predetermined number of cycles such that the stage is configured to move the adjusted distance after a predetermined number of cycles.

As indicated above, the measuring system 76 can be used to determine an amount of error in build thickness per layer or group of layers and store or accumulate that error. This stored value is an accumulated error that can be used to control for a final part height. The accumulated error is represented as a value which is adjusted either positively or negatively by the amount of each newly acquired measured error. The accumulated error can be monitored and compared to a threshold accumulated error value. The threshold accumulated error value is the maximum allowed error in the height of the part 74 or a designated portion of the part 74.

When the accumulated error is equal to or greater than the threshold error value, a compensation layer is planned. The compensation layer is either an existing planned layer currently in the build profile plan that is chosen to be modified or a new layer to be added to the build profile. The compensation layer is dimensioned such that either a thickness of the part 74 is within acceptable limits based on the setpoint described above.

It should be appreciated that choosing of an existing planned layer for modification to be the compensation layer must take into account characteristics of the planned layer. By way of example and not limitation, characteristics of the planned layer can be chosen from the following: total planned layer thickness; total compensation layer thickness; geometry of the planned layer; and a combination thereof. By way of example and not limitation, relevant characteristics of the geometry of the planned layer can include: shape, dimensions, position of the geometry within the layer, the presence of critical dimensions and less critical dimensions of the planned geometry, and a combination thereof.

In the illustrated embodiment, planned layers having geometry other than a rectilinear cross-section having uniform thickness are not used as compensation layers. Stated another way, in the illustrated embodiment, layers having microstructures defined therein are not used as compensation layers.

To create a compensation layer, the stage 14 can be adjusted to define the final compensation layer thickness. This method does might not provide sufficient range in thickness. When compensation layers differ in thickness from the planned layer a substantial amount, the compensation layer thickness is determined by the thickness of the uncured resin layer as deposited. Stated another way, it may be necessary to achieve compensation layer thickness by increasing or decreasing the thickness of the uncured resin layer 110. It should be appreciated that depending upon the geometry of the part 74 and the amount of the accumulated error multiple compensation layers can be utilized to correct for an accumulated error.

The following method utilizes a compensation layer. The method includes the steps of: operating the additive manufacturing apparatus 10 according to a build profile to create a cured layer of a part; measuring a dimension such as a predetermined thickness or distance, for example the distance G, by operating the measuring system 76 to obtain a measured value; comparing the measured value to a predetermined goal as set by the build profile to determine if a measured error exists; adding the measured error to an accumulated error value; comparing the accumulated error value to a threshold error value; responding to the determination of an error by creating a compensation layer by the following steps when the accumulated error value exceeds the threshold error value: selecting one of the following to be utilized as a compensation layer: a previously planned layer and a new layer; determining the thickness of the compensation layer by using the accumulated error value and modifying the build profile accordingly; building the compensation layer.

It should be appreciated that the compensation layer can have a thickness of zero when it is determined that a previously planned layer is to be skipped. Optionally, a compensation layer can be created and built immediately following a specified number of layers or a single layer instead of being based on an accumulated error value is compared to a threshold error value.

The FIG. 9 shows an example of a part 74 two cycles being made according to the method above. A set of ledger lines 81 depicts six planned layers in a build profile. After the fifth cycle as shown, the first five layers are each built such that each is too thin. The amount of error accumulates. Therefore the sixth layer is chosen as a compensating layer. The sixth layer is produced such that it is thicker than originally planned. The total part thickness matches the planned thickness by a combination of the thicker sixth layer and the previous five layers.

It should also be appreciated that the controller 68 can be configured to stop or pause building a part, i.e. a stop or pause a "build". In this regard, a maximum correction can be defined within the controller 68 such that it can be configured to determine if the accumulated error is too large to correct for. In such a case, the build can be paused to be resumed after further evaluation or cancelled.

The foregoing has described a method and apparatus for additive manufacturing. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method for forming a part using an additive manufacturing apparatus that includes a resin support configured to support an uncured layer of resin within a build zone, a stage configured to hold a stacked arrangement of one or more cured layers of the resin that form at least a portion of the part, a measuring system, and an actuator configured to change the relative position of the stage and the resin support the method comprising the steps of:
   performing an additive manufacturing cycle including the following steps:
     depositing an uncured layer of resin;
     moving the stage to a target location;
     curing the uncured layer of resin; and
     moving the stage away from the target location;
   repeating the additive manufacturing cycle;
   performing a measuring process wherein the measuring process includes the following steps:
     using the measuring system to take a measurement indicative of an actual position of a structure;
     comparing the actual position of the structure to an expected position of the structure to determine an error; and
     using the error to modify the target location,
   wherein the measuring system is configured to determine a plane of the structure by measuring a first set of one or more locations after a first cycle and measuring a second set of one or more locations after a second cycle, the second set of one or more locations being different than the first set of one or more locations.

2. The method of claim 1, wherein the step of performing a measuring process is performed every cycle.

3. The method of claim 1, wherein the step of using the error is performed every cycle during which a measuring process is performed.

4. The method of claim 1, wherein a total error is determined utilizing multiple steps of using the measuring system.

5. The method of claim 1, wherein the structure is one of the following: the stage, a surface of the uncured layer of resin, a surface of the part, or a combination thereof.

6. The method of claim 1, wherein the structure is the part.

7. The method of claim 1, wherein the measurement indicative of the actual position of the structure is taken relative a reference location that is positioned on the stage.

8. The method of claim 7, wherein the reference location is defined by a cured layer of resin.

9. The method of claim 8, wherein the reference location is defined by the part.

10. The method of claim 8, wherein the apparatus is configured such that the reference location can be defined by a block that is built on the stage in parallel with the part.

11. The method of claim 10, wherein the block is a frame positioned around the part.

12. The method of claim 1, wherein the structure is a surface of the part.

13. The method of claim 12, further comprising generating a signal indicative of a position of the stage, wherein the signal is feedback utilized by the computer to adjust the height of the stage relative to an expected height.

14. The method of claim 12, wherein the stage is configured to move an adjusted distance equal to a predetermined layer thickness plus an amount equal to accumulated error.

15. The method of claim 14, wherein a cured layer of resin is created in a cycle and the stage is configured to move the adjusted distance after a predetermined number of cycles.

16. An additive manufacturing apparatus, comprising:
   a resin support that defines a build surface that is configured to support an uncured layer of resin;
   a stage configured to hold a stacked arrangement of one or more cured layers of resin that form a part that defines a surface positioned opposite the stage;
   a radiant energy apparatus positioned opposite to the stage such that it is operable to generate and project radiant energy in a predetermined pattern;
   an actuator configured to change the relative position of the stage and the resin support; and
   a measuring system that is configured for measuring the position of one or more structures relative to the resin support, determining an error in the position of the one or more structures, and determining a plane of the one or more structures by measuring a first set of one or more locations after a first cycle and measuring a second set of one or more locations after a second cycle, the second set of one or more locations is different than the first set of one or more locations; and
   a controller communicatively coupled to the actuator and the measuring system, the controller programmed to:
     receive a signal indicative of the error from the measuring system; and
     transmit one or more instructions to the actuator to cause a change in the relative position of the stage and the resin support;
   wherein the structure is one of the following: the stage, a surface of the uncured layer of resin, a surface of the part, or a combination thereof.

17. The additive manufacturing apparatus of claim 16, wherein the measuring system includes a laser rangefinder and the structures to be measured are the surface of the part and the surface of the uncured resin and the measuring system is configured to generate a signal indicative of the position of the surface of the part relative to the surface of the uncured resin and to determine movement of the stage based upon the signal.

18. The additive manufacturing apparatus of claim 17, wherein the layer of uncured resin is configured to be cured by a first range of light frequencies and the measuring system includes an optical sensor that generates a second range of light frequencies and the second range is different than the first range.

19. The additive manufacturing apparatus of claim 16, comprising a reference location that is positioned on the stage.

20. A method for forming a part using an additive manufacturing apparatus that includes a resin support configured to support an uncured layer of resin within a build zone, a stage configured to hold a stacked arrangement of one or more cured layers of resin that form at least a portion of the part, a measuring system, and an actuator configured to change the relative position of the stage and the resin support, the method comprising the steps of:

operating the additive manufacturing apparatus in accordance with a build profile to create a cured build layer of a part;

measuring a dimension of the part using the measuring system, wherein the measuring system is configured to determine a plane of the part by measuring a first set of one or more locations after a first cycle and measure a second set of one or more locations after a second cycle, the second set of one or more locations is different than the first set of one or more locations;

determining whether the dimension includes an error;

responding to the determination of an error by modifying the build profile to include a compensation layer wherein the thickness of the compensation layer is chosen to compensate for the error.

21. The method according to claim 20, further comprising the steps of:

adding the error to an accumulated error value;

determining the thickness of the compensation layer by using the accumulated error value; and wherein the accumulated error value is developed over multiple cycles.

22. The method according to claim 21, further comprising the steps of comparing the accumulated error value to a threshold error value; and performing the step of creating the compensation layer when the accumulated error value exceeds the threshold error value.

23. The method according to claim 20, further comprising the step of: selecting one of the following to be utilized as a compensation layer: a previously planned layer and a new layer.

24. The method according to claim 20, wherein the dimension is the thickness of the cured build layer.

25. The method according to claim 20, wherein the dimension is the height of the part.

\* \* \* \* \*